(12) United States Patent
Ok et al.

(10) Patent No.: US 12,476,494 B2
(45) Date of Patent: Nov. 18, 2025

(54) INDUCTION HEATING AND WIRELESS POWER TRANSMITTING APPARATUS HAVING CONTROL ALGORITHM

(71) Applicant: LG ELECTRONICS INC., Seoul (KR)

(72) Inventors: Seungbok Ok, Seoul (KR); Dooyong Oh, Seoul (KR); Hyunwook Moon, Seoul (KR); Byeong Wook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/127,193

(22) Filed: Mar. 28, 2023

(65) Prior Publication Data

US 2023/0253834 A1     Aug. 10, 2023

Related U.S. Application Data

(62) Division of application No. 16/643,503, filed as application No. PCT/KR2018/009293 on Aug. 13, 2018, now abandoned.

(30) Foreign Application Priority Data

Aug. 31, 2017  (KR) .................. 10-2017-0111470
Dec. 15, 2017  (KR) .................. 10-2017-0173674

(51) Int. Cl.
*H02J 50/60*     (2016.01)
*H02J 5/00*      (2016.01)
*H02J 7/02*      (2016.01)
*H02J 50/12*     (2016.01)
*H02J 50/40*     (2016.01)
(Continued)

(52) U.S. Cl.
CPC .............. *H02J 50/60* (2016.02); *H02J 5/00* (2013.01); *H02J 7/02* (2013.01); *H02J 50/12* (2016.02);
(Continued)

(58) Field of Classification Search
None
See application file for complete search history.

(56) References Cited

U.S. PATENT DOCUMENTS 10,336,201 B2 *  7/2019  Kotani ................... B60L 53/38
10,630,115 B2 *  4/2020  Asanuma ............ H02J 7/00309
(Continued)

FOREIGN PATENT DOCUMENTS

| EP | 2661152 A1 | 11/2013 |
| EP | 0971562 B2 | 3/2014 |
| EP | 3133899 A1 | 2/2017 |

OTHER PUBLICATIONS

Extended European Search Report in European Appln. No. 24186320.8, mailed on Oct. 23, 2024, 8 pages.

*Primary Examiner* — Adi Amrany
(74) *Attorney, Agent, or Firm* — Fish & Richardson P.C.

(57) ABSTRACT

An induction heating and wireless power transmitting apparatus includes: a first working coil portion including first and second working coils that are connected in parallel; a first inverter configured to apply a resonant current to the first working coil and the second working coil by performing a switching operation; a first semiconductor switch connected to the first working coil and configured to turn the first working coil on or off; a second semiconduction switch connected to the second working coil and configured to turn the second working coil on or off; and a controller configured to detect whether an object is positioned above the first working coil or the second working coil based on controlling the first and second semiconductor switched and the first inverter.

8 Claims, 13 Drawing Sheets

(51) Int. Cl.
  *H02J 50/80*    (2016.01)
  *H02J 50/90*    (2016.01)
  *H05B 1/02*     (2006.01)
  *H05B 6/06*     (2006.01)
  *H05B 6/44*     (2006.01)

(52) U.S. Cl.
  CPC .............. *H02J 50/40* (2016.02); *H02J 50/80* (2016.02); *H02J 50/90* (2016.02); *H05B 1/0266* (2013.01); *H05B 6/065* (2013.01); *H05B 6/44* (2013.01)

(56) References Cited

U.S. PATENT DOCUMENTS

| | | |
|---|---|---|
| 2010/0243642 A1 | 9/2010 | Gouardo et al. |
| 2011/0285210 A1* | 11/2011 | Lemmens ......... H02J 7/007182 307/104 |
| 2012/0242276 A1* | 9/2012 | Jung ....................... H02J 50/60 307/104 |
| 2013/0093253 A1* | 4/2013 | Norconk .................. H04B 5/79 307/104 |
| 2015/0355359 A1* | 12/2015 | Miyashita ............... H01F 38/14 324/207.16 |
| 2016/0028266 A1* | 1/2016 | Madau .................... H02J 50/10 320/108 |
| 2016/0029439 A1* | 1/2016 | Kurose ................. H05B 6/065 219/626 |
| 2016/0285278 A1* | 9/2016 | Mehas ................... H02J 50/12 |
| 2017/0033615 A1* | 2/2017 | Asanuma ............... H02J 50/12 |
| 2018/0131235 A1* | 5/2018 | Inoue ..................... H02J 50/12 |
| 2018/0233955 A1* | 8/2018 | Park ..................... H02M 7/537 |
| 2020/0204013 A1* | 6/2020 | Chen ................... H02J 7/00308 |
| 2020/0367323 A1* | 11/2020 | Ok ........................ H05B 6/065 |

\* cited by examiner

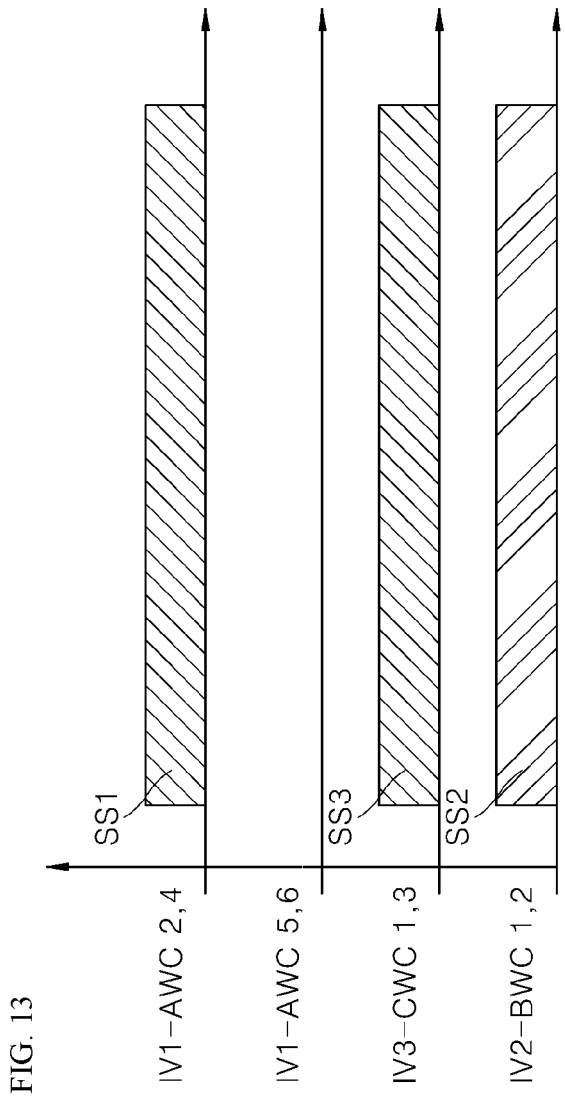

INDUCTION HEATING AND WIRELESS POWER TRANSMITTING APPARATUS HAVING CONTROL ALGORITHM

CROSS-REFERENCE TO RELATED APPLICATIONS

This application is a divisional of U.S. application Ser. No. 16/643,503, filed on Feb. 28, 2020, which is a National Stage application under 35 U.S.C. § 371 of International Application No. PCT/KR2018/009293, filed on Aug. 13, 2018, which claims the benefit of Korean Patent Application No. 10-2017-0111470, filed on Aug. 31, 2017 and Korean Patent Application No. 10-2017-0173674, filed on Dec. 15, 2017. The disclosures of the prior applications are incorporated by reference in their entirety.

TECHNICAL FIELD

The present disclosure relates to an induction heating and wireless power transmitting apparatus with improved control algorithms.

BACKGROUND

Various types of cooking utensils may be used to heat food in homes and restaurants. For example, gas ranges may use gas as fuel. In some cases, cooking apparatuses may use electricity instead of gas to heat an object such as a cooking vessel or a pot, for example.

In some examples, methods for heating an object via electricity may be classified into a resistive heating method and an induction heating method. In the electrical resistive method, heat may be generated based on current flowing through a metal resistance wire or a non-metallic object such as silicon carbide, and the heat may be transmitted to the object through radiation or conduction to heat the object. In the induction heating method, eddy current may be generated in the object (e.g., the cooking vessel) made of metal based on a magnetic field generated around the coil, when a high-frequency power of a predetermined magnitude is applied to the coil to heat the object.

In some examples, electronic apparatuses may wirelessly receive power. For example, an electronic apparatus may use a technology for transmitting wireless power and may be charged by simply placing the electronic apparatuses on a charging pad rather than connecting the electronic apparatus to an additional charge connector. The electronic apparatus may not require a wired cord or a charger, thereby improving portability thereof and reducing a size and a weight thereof.

The technology for transmitting the wireless power may use an electromagnetic induction method using a coil, a resonance method using resonance, and a radio wave radiation method in which electrical energy is converted into a microwave, and the converted microwave is transmitted. The electromagnetic induction method may use electromagnetic induction between a primary coil provided in a wireless power transmitting apparatus and a secondary coil provided in a wireless power receiving apparatus to transmit the power.

The above-mentioned induction heating method of the induction heating apparatus substantially has the same principle as the technology for transmitting the wireless power using electromagnetic induction in that the object is heated by electromagnetic induction.

In some cases, an induction heating and wireless power transmitting apparatus may be capable of selectively performing the induction heating and the wireless power transmission according to needs of users.

For example, the induction heating and wireless power transmitting apparatus may include a working coil in multiple regions to heat the plurality of objects (e.g., cooking vessels) or to wirelessly transmit the power to the plurality of objects (e.g., wireless power receiving apparatuses).

In some cases, induction heating and wireless power transmitting apparatuses (e.g., zone-free type induction heating and wireless power transmitting apparatuses) may simultaneously heat an object with the plurality of working coils or wirelessly transmit the power to an object through the plurality of working coils.

The zone-free type induction heating and wireless power transmitting apparatus may inductively heat the object or wirelessly transmit the power to the object regardless of sizes and positions of objects in an area where the plurality of working coils are present.

FIG. 1 is a block diagram showing a zone-free type induction heating apparatus in related art.

Referring to FIG. 1, a zone-free type induction heating apparatus 10a may include a plurality of working coils 26a and 28a, and the plurality of working coils 26a and 28a are electrically connected to respective further switches 40a and 42a (e.g., three-terminal switches), respectively, to switch circuits for object detection operation. In some cases, noise may occur during the switching operation of each of the further switches 40a and 42a due to the above structure.

In some cases, when the object is disposed above the different working coils 26a and 28a, a switch 30a and a second switch 32a may be switched to be connected to a first inverter 18a and a second inverter 20a, respectively, to control synchronization of each of the working coils 26a and 28a. In some cases, noise may occur due to the switching operation of each of the group relays.

In some cases, the switches 30a and 32a, the switches 40a and 42a, and the object detection circuit provided for the object detection occupy a substantial portion of a circuit area.

SUMMARY

The present disclosure describes an induction heating and wireless power transmitting apparatus with improved object detection algorithms.

The present disclosure also describes an induction heating and wireless power transmitting apparatus with improved output control algorithms.

The present disclosure further describes an induction heating and wireless power transmitting apparatus that may reduce or prevent noise occurring during the relay switching operation by eliminating a relay and an object detection circuit and may also reduce a circuit volume.

The objects of the present disclosure are not limited to the above-mentioned objects and other objects and advantages of the present disclosure which are not mentioned can be understood by the following description and more clearly understood by the implementations of the present disclosure. It will also be readily apparent that the objects and the advantages of the present disclosure can be implemented by features described in claims and a combination thereof.

According to one aspect of the subject matter described in this application, an apparatus for induction heating and wireless power transmission includes a first group of working coils including a first working coil and a second working coil that are electrically connected to each other in parallel, a first inverter configured to perform a switching operation to generate a resonance current in at least one of the first working coil or the second working coil, a first semiconductor switch electrically connected to the first working coil and configured to turn on and turn off the first working coil, a second semiconductor switch electrically connected to the second working coil and configured to turn on and turn off the second working coil, and a controller configured to control operation of each of the first inverter, the first semiconductor switch, and the second semiconductor switch to thereby detect whether an object is disposed above at least one of the first working coil or the second working coil.

Implementations according to this aspect may include one or more of the following features. For example, the controller may be configured to: provide the first inverter with a plurality of pulses including one pulse, two pulses, or three pulses, each pulse being applied to the first inverter for a period of time; and turn on and turn off each of the first semiconductor switch and the second semiconductor switch by providing the first inverter with the plurality of pulses until a position of the object is detected. In some examples, the controller may be configured to provide the first inverter with the plurality of pulses after turning on the first semiconductor switch at a first time point, and based on the object not being detected after the first time point and before a second time point, turn off the first semiconductor switch and turn on the second semiconductor switch at the second time point, and then provide the first inverter with the plurality of pulses again.

In some implementations, the controller may be configured to, based on the object not being detected after the second time point and before a third time point, turn off the second semiconductor switch and turn on the first semiconductor switch at the third time point, and then provide the first inverter with the plurality of pulses again. In some examples, the controller may be configured to: based on an elapse of a first delay after the first semiconductor switch is turned on at the first time point, provide the plurality of pulses to the first inverter; and based on an elapse of a second delay after providing the plurality of pulses to the first inverter, turn off the first semiconductor switch at the second time point.

In some implementations, the controller may be configured to, based on a determination that the object is disposed above the first working coil, provide the first inverter with a switching signal having a frequency and a phase that are adjusted corresponding to a power level input by a user, and turn on and turn off the first semiconductor switch based on the switching signal. In some examples, the controller may be configured to: stop providing the first inverter with the switching signal to detect whether another object is disposed above the second working coil; turn off the first semiconductor switch and turn on the second semiconductor switch at a start of a predetermined period of time after stopping providing the first inverter with the switching signal; and provide the first inverter with a single pulse within the predetermined period of time after turning on the second semiconductor switch.

In some examples, the controller may be configured to, based on another object not being detected above the second working coil until an end of the predetermined period of time, turn off the second semiconductor switch and turn on the first semiconductor switch at the end of the predetermined period of time, and provide the first inverter with the switching signal again after turning on the first semiconductor switch at the end of the predetermined period of time.

In some implementations, the controller may be configured to detect an attenuation degree of the resonance current generated in the at least one of the first working coil or the second working coil, and based on the attenuation degree of the resonance current, determine a position of the object above the at least one of the first working coil or the second working coil. In some examples, the controller may be configured to: compare a first attenuation degree of the resonance current generated in the first working coil with a second attenuation degree of the resonance current generated in the second working coil; and based on the first attenuation degree being greater than the second attenuation degree, determine that the object is disposed above the first working coil.

According to another aspect, an apparatus for induction heating and wireless power transmission includes a first group of working coils including a first working coil and a second working coil that are electrically connected to each other in parallel, a first inverter configured to perform a first switching operation to generate a first resonance current in at least one of the first working coil or the second working coil, a second group of working coils including a third working coil and a fourth working coil that are electrically connected to each other in parallel, a second inverter electrically connected to the first inverter in parallel and configured to perform a second switching operation to generate a second resonance current to at least one of the third working coil or the fourth working coil, and a controller. The controller is configured to: provide the first inverter with a first switching signal to control operation of the first inverter, the first switching signal having a first frequency and a first phase, provide the second inverter with a second switching signal to control operation of the second inverter, the second switching signal having a second frequency and a second phase, and adjust the first frequency, the second frequency, the first phase, and the second phase based on a position of an object disposed above at least of the first working coil, the second working coil, the third working coil, or the fourth working coil.

Implementations according to this aspect may include one or more of the following features. For example, the controller may be configured to: based on a first object being disposed above the first group of working coils, adjust the first frequency and the first phase of the first switching signal to correspond to a first power level to be transmitted to the first object; and based on a second object being disposed above the second group of working coils, adjust the second frequency and the second phase of the second switching signal to correspond to a second power level to be transmitted to the second object.

In some implementations, the controller may be configured to, based on portions of the object being disposed above the first working coil and the third working coil, synchronize the first frequency and the second frequency and synchronize the first phase and the second phase to correspond to a power level to be transmitted to the object. In some examples, the controller may be configured to: match the first frequency with the second frequency to synchronize the first frequency and the second frequency corresponding to the power level; and match the first phase with the second phase to synchronize the first phase and the second phase corresponding to the power level.

In some implementations, the apparatus may further include a third ground of working coils including a fifth working coil and a sixth working coil that are electrically connected to each other in parallel, a third inverter that is connected to each of the first inverter and the second inverter electrically in parallel and that may be configured to perform a third switching operation to generate a third resonance current in at least one of the fifth working coil or the sixth working coil, a first semiconductor switch electrically connected to the first working coil and configured to turn on and turn off the first working coil, a second semiconductor switch electrically connected to the second working coil and configured to turn on and turn off the second working coil, a third semiconductor switch electrically connected to the third working coil and configured to turn on and turn off the third working coil, a fourth semiconductor switch electrically connected to the fourth working coil and configured to turn on and turn off the fourth working coil, a fifth semiconductor switch electrically connected to the fifth working coil and configured to turn on and turn off the fifth working coil, a sixth semiconductor switch electrically connected to the sixth working coil and configured to turn on and turn off the sixth working coil.

The controller may be configured to provide a third switching signal to the third inverter to control operation of the third inverter, the third switch signal having a third frequency and a third phase, and adjust the first frequency, the second frequency, the third frequency, the first phase, the second phase, and the third phase based on the position of the object disposed above at least one of the first working coil, the second working coil, the third working coil, the fourth working coil, the fifth working coil, and the sixth working coil.

In some implementations, the controller may be configured to detect a first object disposed above the first working coil and the third working coil, and detect a second object disposed above the second working coil and the fifth working coil. In some examples, the controller may be configured to: synchronize the first frequency, the second frequency, and the third frequency and synchronize the first phase, the second phase, and the third phase to correspond to a first power level to be transmitted to the first object, the first power level being greater than a second power level to be transmitted to the second object; provide the first inverter with the first switching signal after turning on the first semiconductor switch and the second semiconductor switch; turn on the second semiconductor switch after turning off the second semiconductor switch for a specific period of time to correspond to the second power level; provide the second inverter with the synchronized second switching signal after turning on the third semiconductor switch; provide the third inverter with the synchronized third switching signal after turning on the fifth semiconductor switch; and turn on the fifth semiconductor switch after turning off the fifth semiconductor switch for the specific period of time to correspond to the second power level.

In some implementations, the controller may be configured to: synchronize the first frequency and the second frequency and synchronize the first phase and the second phase to correspond to a first power level to be transmitted to the first object, the first power level being greater than a second power level to be transmitted to the second object; provide the first inverter with the synchronized first switching signal after turning on the first semiconductor switch in a state in which the second semiconductor switch is turned off; provide the second inverter with the synchronized second switching signal after turning on the third semiconductor switch; adjust the third frequency and the third phase of the third switching signal based on the second power level; and provide the third inverter with the adjusted third switching signal after turning on the fifth semiconductor switch.

In some implementations, the controller may be configured to: receive from the object, object information including at least one of a type of the object, a charging mode of the object, and an amount of power to charge the object; and determine the first switching signal or the second switching signal based on the objected information. In some examples, the controller may be configured to, based on the charging mode of the object disposed above the first working coil corresponding to a fast charging mode, adjust the first frequency to increase a magnitude of the first resonance current generated in the first working coil.

In some implementations, an induction heating and wireless power transmitting apparatus may include a controller configured to control operation of each of an inverter and a semiconductor switch to detect which working coil an object is disposed, thereby improving object detection algorithms.

In some implementations, the induction heating and wireless power transmitting apparatus may include a controller configured to adjust a frequency and a phase of a switching signal provided to each of inverters based on the position of the object, thereby improving output control algorithms.

In some implementations, the induction heating and wireless power transmitting apparatus may perform the object detection operation and output control operation using the semiconductor switch and the controller instead of a relay and an object detection circuit, thereby reducing or avoiding noise occurring during the relay switching operation and reducing circuit volume.

In some implementations, an induction heating and wireless power transmitting apparatus may improve the object detection speed and algorithm by separating a plurality of working coils independently through the semiconductor switch and the controller, and turning on or off each of the divided plurality of working coils at high speed. Further, the object detection operation is continually performed with respect to the working coil that is not driven, thereby improving reliability in the object detection.

In some implementations, the induction heating and wireless power transmitting apparatus may improve output control algorithms by synchronizing or desynchronizing frequencies and phases of the switching signals provided to each of inverters based on positions of objects. Further, through improvement in the output control algorithm, heating efficiency or wireless power transmission efficiency with respect to the object may be improved. Accordingly, user satisfaction may be improved.

In some implementations, the induction heating and wireless power transmitting apparatus may reduce or prevent noise occurring during the switching operation of the relay by performing the object detection operation and the output control operation using the semiconductor switch and the controller instead of the relay and the object detection circuit, thereby improving user satisfaction. Further, the user may quietly use the induction heating and wireless power transmitting apparatus even in a time zone (e.g., at dawn or late night) sensitive to noise problems, thereby improving user convenience. Further, circuit volume may be reduced by eliminating bulky relays and object detection circuits in the circuit, thereby reducing overall volume of the induction heating and wireless power transmitting apparatuses. Furthermore, space utilization may be improved by reducing the overall volume of the induction heating and wireless power transmitting apparatus.

Further to the effects described above, specific effects of the present disclosure are described together while describing detailed matters for implementing the present disclosure.

DESCRIPTION OF DRAWINGS

FIG. 13 is a schematic diagram showing another example of an output control method of an induction heating and wireless power transmitting apparatus based on the positions of the objects in FIG. 11.

DETAILED DESCRIPTION

Figure 1:
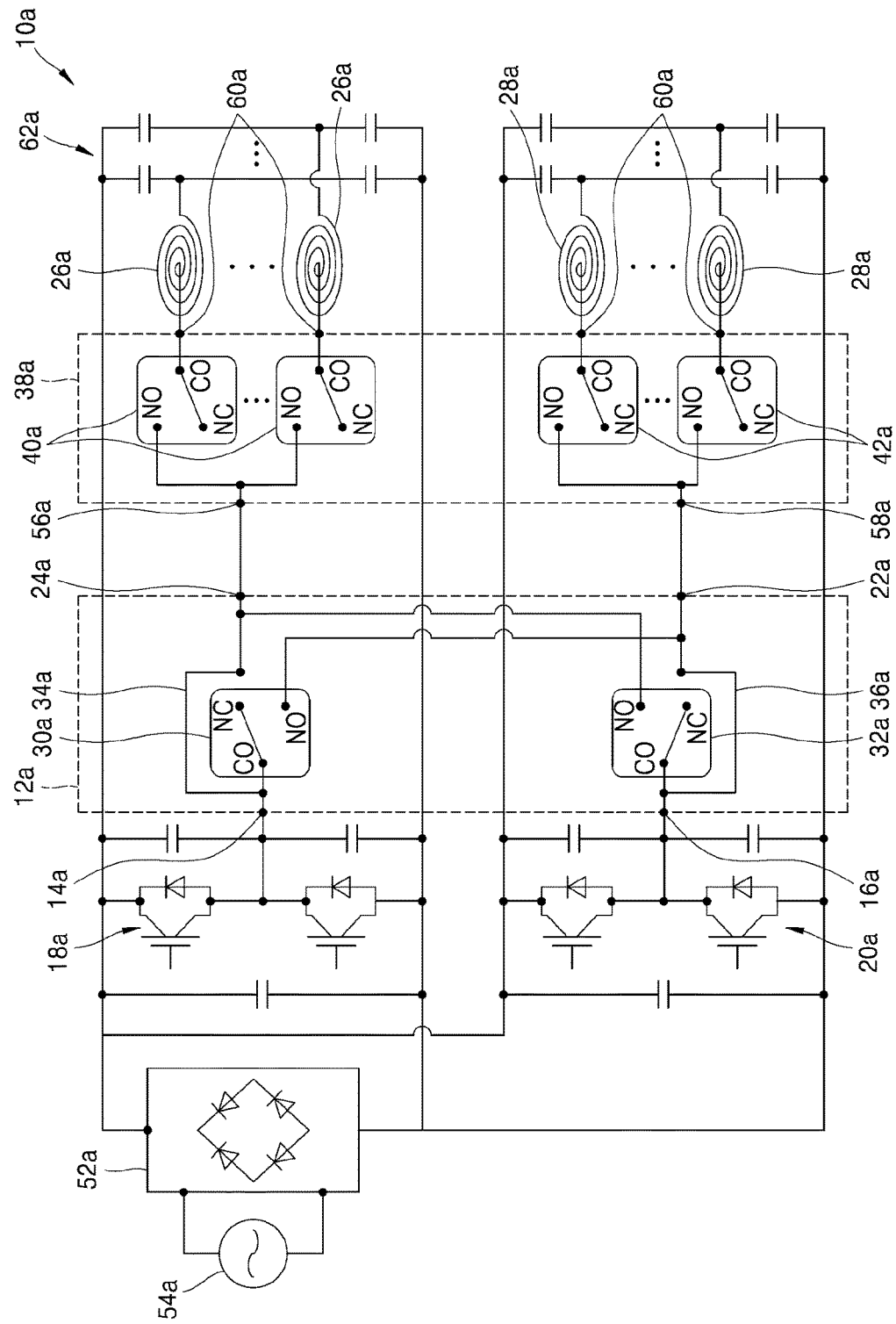
FIG. 1 is a block diagram showing a zone-free type induction heating apparatus in related art.

Hereinafter, exemplary implementations of the present disclosure are described below in detail with reference to the accompanying drawings. In the drawings, the same reference numerals are used to indicate the same or similar components.

Figure 2:
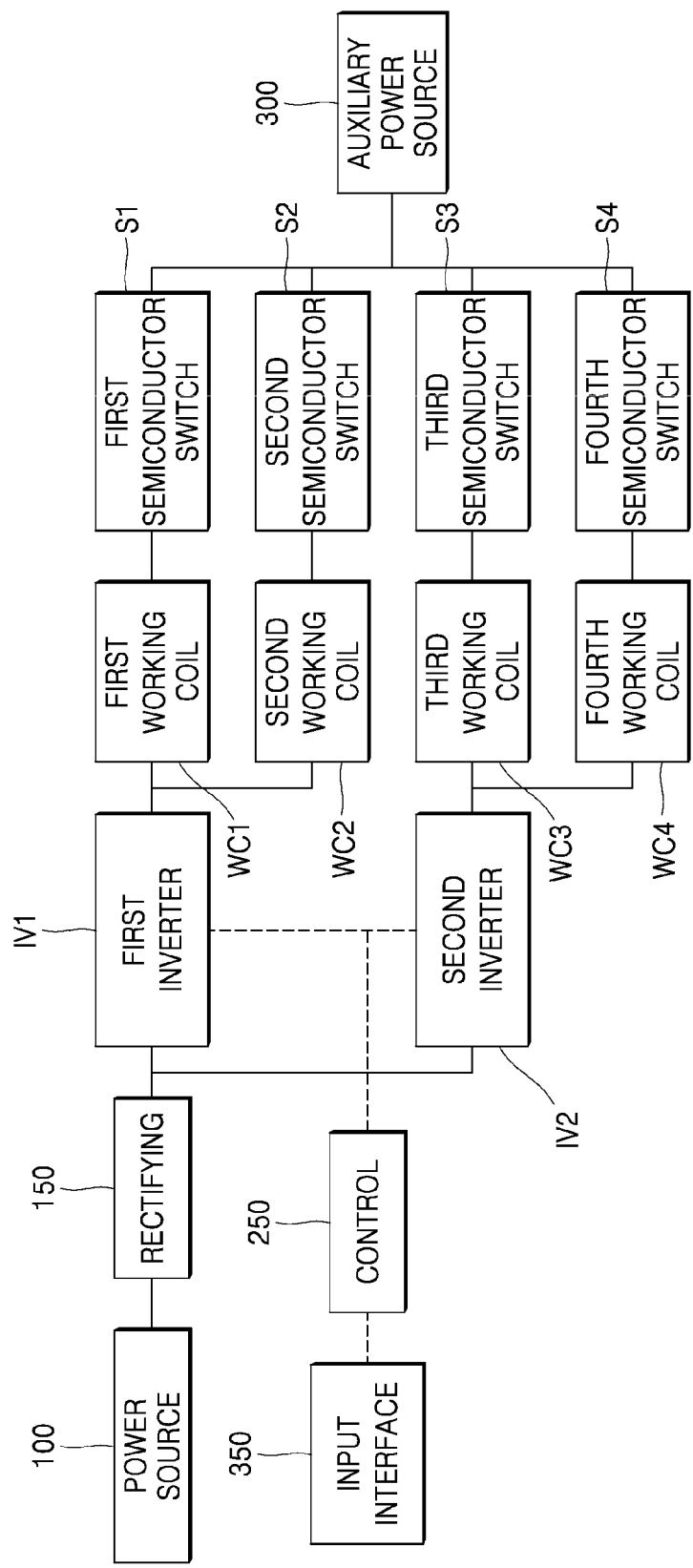
FIG. 2 is a block diagram showing an example of an induction heating and wireless power transmitting apparatus according to the present application.

FIG. 2 is a block diagram showing an example of an induction heating and wireless power transmitting apparatus.

Referring to FIG. 2, an induction heating and wireless power transmitting apparatus 1 may include a power source 100, a rectifier 150, a first inverter IV1, a second inverter IV2, a controller 250, a first working coil WC1 to a fourth working coil WC4, a first semiconductor switch S1 to a fourth semiconductor switch S4, an auxiliary power source 300, and an input interface 350.

In some examples, a number of some components (e.g., the inverter, the working coil, the semiconductor switch, and the like) of the induction heating and wireless power transmitting apparatus 1 shown in FIG. 2 may be changed.

The power source 100 may output alternating current (AC) power.

In detail, the power source 100 may output the AC power and may provide the AC power to the rectifier 150. For example, the power source 100 may be a commercial power source.

The rectifier 150 may convert, into direct current (DC) power, the AC power received from the power source 100 and may supply the DC power to at least one of the first inverter IV1 and the second inverter IV2.

In detail, the rectifier 150 may rectify the AC power received from the power source 100 and may convert the AC power into the DC power.

In some examples, the DC power rectified by the rectifier 150 may be provided to a filter and the filter may remove AC component remaining in the DC power. The DC power rectified by the rectifier 150 may also be provided to a DC link capacitor (e.g., a smoothing capacitor) and the DC link capacitor may reduce ripple of the DC power.

As described above, the DC power rectified by the rectifier 150 and the filter (or the DC link capacitor) may be supplied to at least one of the first inverter IV1 and the second inverter IV2.

The first inverter IV1 may perform switching operation to apply the resonance current to at least one of the first working coil WC1 and the second working coil WC2.

In detail, the switching operation of the first inverter IV1 may be controlled by the controller 250. That is, the first inverter IV1 may perform the switching operation based on a switching signal received from the controller 250.

In some examples, the first inverter IV1 may include two switching elements and the two switching elements are alternately turned on and off based on the switching signal received from the controller 250.

Further, high-frequency AC (i.e., resonance current) may be generated through the switching operation of each of the two switching elements and the generated high-frequency AC is applied to at least one of the first working coil WC1 and the second working coil WC2.

Similarly, the second inverter IV2 may perform the switching operation and may apply the resonance current to at least one of the third working coil WC3 and the fourth working coil WC4.

In detail, the switching operation of the second inverter IV2 may be controlled by the controller 250. That is, the second inverter IV2 may perform the switching operation based on the switching signal received from the controller 250.

In some examples, the second inverter IV2 may include two switching elements and the two switching elements are alternately turned on and off based on the switching signal received from the controller 250.

The high-frequency AC (i.e., the resonance current) may also be generated through the switching operation of each of the two switching elements and the generated high-frequency AC may be applied to at least one of a third working coil WC3 and a fourth working coil WC4.

The controller 250 may control operations of the first inverter IV1 and the second inverter IV2 and the first semiconductor switch S1 to the fourth semiconductor switch S4. In some examples, the controller 250 may include at least one of an electric circuit, one or more processors, a non-transitory memory, or a communication device (e.g., a transducer, a modem, a Bluetooth device, a Wi-Fi device, etc.).

Specifically, the switching operation of each of the first inverter IV1 and the second inverter IV2 may be controlled based on the switching signal of the controller 250 and the first semiconductor switch S1 to the fourth semiconductor switch S4 may be turned on or off sequentially or in a specific sequence or simultaneously based on the control signal of the controller 250.

For example, when the first inverter IV1 is driven based on the switching signal of the controller 250 and the first semiconductor switch S1 is turned on based on the control signal of the controller 250, the resonance current may be applied to the first working coil WC1.

As described above, an object disposed above the first working coil WC1 may be heated based on the resonance current applied to the first working coil WC1 or the power may be wirelessly transmitted to the object.

In some examples, the controller 250 may generate various types of switching signals or control signals by performing a function for pulse width modulation (PWM).

Further, a driving mode of the induction heating and wireless power transmitting apparatus, that is, an induction heating mode or a wireless power transmission mode may be controlled by the controller 250.

That is, when the driving mode of the induction heating and wireless power transmitting apparatus is set as the wireless power transmission mode by the controller 250, at least one of the first working coil WC1 to the fourth working coil WC4 is driven to wirelessly transmit the power to the object.

In some examples, when the driving mode of the induction heating and wireless power transmitting apparatus is set as the induction heating mode by the controller 250, at least one of the first working coil WC1 to the fourth working coil WC4 is driven to heat the object.

The number of working coils driven under the control of the controller 250 may also be determined and an amount of transmitted power or heating intensity of the induction heating and wireless power transmitting apparatus may vary depending on the number of driven working coils.

The controller 250 may determine which working coil to drive based on the position of the object and may determine whether the switching signals are synchronized between driven working coils.

The controller 250 may detect the resonance current flowing through the first working coil WC1 to the fourth working coil WC4 and may determine, based on the detected value, which coil of the first working coil WC1 to the fourth working coil WC4 the object is disposed.

The controller 250 may also determine whether the object is made of a magnetic material or a nonmagnetic material based on the detection value.

Specifically, when the object seated on the induction heating and wireless power transmitting apparatus is made of the magnetic material, a relatively less magnitude of resonance current flows through the working coil because a greater magnitude of eddy current is induced to the object from the working coil. By contrast, when the object seated on the induction heating and wireless power transmitting apparatus does not present or is made of the non-magnetic material, the working coil may not resonate, and thus, a relatively greater magnitude of resonance current flows through the working coil.

Therefore, the controller 250 may determine that the driven object is made of the magnetic material based on the magnitude of the resonance current flowing through the working coil being less than a preset reference current value. By contrast, based on a magnitude of resonance current flowing through the working coil being greater than or equal to the preset reference current value, the controller 250 may determine that the object is made of the nonmagnetic material.

In some implementations, the induction heating and wireless power transmitting apparatus may further include a detector that detects resonance current flowing through the working coil and the detector may perform the function for detecting the object described above.

For convenience of description, for example, the controller 250 performs a function for detecting the object.

The first working coil WC1 and the second working coil WC2 may be electrically connected to each other in parallel.

In detail, the first working coil WC1 and the second working coil WC2 may be electrically connected to each other in parallel and may receive the resonance current from the first inverter IV1.

That is, when the driving mode of the induction heating and wireless power transmitting apparatus is the induction heating mode, eddy current may be generated between the working coil and the object based on the high-frequency AC applied to at least one of the first working coil WC1 and the second working coil WC2 from the first inverter IV1 to heat the object.

When the driving mode of the induction heating and wireless power transmitting apparatus is the wireless power transmission mode, magnetic field may also be generated by the working coil based on the high-frequency AC applied to at least one of the first working coil WC1 and the second working coil WC2 from the first inverter IV1. As a result, the current may also flow through the coil inside the object corresponding to the working coil and the object may be charged based on the current flowing through the coil inside the object.

The first working coil WC1 may also be electrically connected to a first semiconductor switch S1 and the second working coil WC2 may be electrically connected to a second semiconductor switch S2.

Accordingly, each of the working coils may be turned on or off at high speeds by the corresponding semiconductor switch.

The third working coil WC3 and the fourth working coil WC4 may be electrically connected to each other in parallel.

In detail, the third working coil WC3 and the fourth working coil WC4 may be electrically connected to each other in parallel and may receive the resonance current from the second inverter IV2.

That is, when the driving mode of the induction heating and wireless power transmitting apparatus is the induction heating mode, the eddy current may be generated between the working coil and the object based on the high-frequency AC applied to at least one of the third working coil WC3 and the fourth working coil WC4 from the second inverter IV2.

Further, when the driving mode of the induction heating and wireless power transmitting apparatus is the wireless power transmission mode, the magnetic field may be generated by the working coil based on the high-frequency AC applied to at least one of the third working coil WC3 and the fourth working coil WC4 from the second inverter IV2. As a result, the current may also flow through the coil inside the object corresponding to the working coil and the object may be charged based on the current flowing through the coil inside the object.

The third working coil WC3 may also be electrically connected to the third semiconductor switch S3 and the fourth working coil WC4 may be electrically connected to the fourth semiconductor switch S4.

Accordingly, each of the working coils may be turned on or off at high speed by the corresponding semiconductor switch.

In some examples, the turn-on or turn-off of the working coil performed by the semiconductor switch may refer a flow of resonance current applied to the working coil from the inverter being unblocked or blocked by the semiconductor switch.

In some examples, the first semiconductor switch S1 to the fourth semiconductor switch S4 may be electrically connected to the first working coil WC1 to the fourth working coil WC4, respectively, to turn on or off the first working coil WC1 to the fourth working coil WC4, respectively, and may receive the power from the auxiliary power source 300.

In detail, the first semiconductor switch S1 may be electrically connected to the first working coil WC1 to turn on or off the first working coil WC1 and the second semiconductor switch S2 may be electrically connected to the second working coil W2 to turn on or off the second working coil WC2.

The first semiconductor switch S1 and the second semiconductor switch S2 are also driven by the controller 250 in association with the first inverter IV1, and thus, the first semiconductor switch S1 and the second semiconductor switch S2 may be used to detect the presence of the object disposed above the first working coil WC1 and the second working coil WC2 or to control the output of each of the first working coil WC1 and the second working coil WC2.

In some examples, the third semiconductor switch S3 may be electrically connected to the third working coil WC3 to turn on or off the third working coil WC3 and the fourth semiconductor switch S4 may be electrically connected the fourth working coil WC4 to turn on or off the fourth working coil WC4.

The third semiconductor switch S3 and the fourth semiconductor switch S4 are also driven in association with the second inverter IV2 by the controller 250, and thus, the third semiconductor switch S3 and the fourth semiconductor switch S4 may be used to detect the presence of the object disposed above the third working coil WC3 and the fourth working coil WC4 and to control the output of each of the third working coil WC3 and the fourth working coil WC4.

In some examples, the first semiconductor switch S1 to the fourth semiconductor switch S4 may include, for example, static switches. For example, the first semiconductor switch S1 to the fourth semiconductor switch S4 each may also include a metal oxide semiconductor field effect transistor (MOSFET) or an insulated gate bipolar mode transistor (IGBT).

The auxiliary power source 300 may supply power to the first semiconductor switch S1 to the fourth semiconductor switch S4.

In detail, the auxiliary power source 300 may have a single output structure (i.e., one output terminal). Therefore, the auxiliary power source 300 may supply the power to the first semiconductor switch S1 to the fourth semiconductor switch S4 with a single output. The auxiliary power source 300 may also reduce a number of pins required for connection with the first semiconductor switch S1 to the fourth semiconductor switch S4 when compared to other multiple output structures.

In some implementations, if the single output capacity is too greater (i.e., greatly out of predetermined reference capacity), the auxiliary power source 300 may have a dual output structure (each of the output terminals divides the single output capacity into a capacity equal to or less than the predetermined reference capacity and outputs the capacity).

In some examples, the auxiliary power source 300 may include, for example, a switched mode power source (SMPS), but is not limited thereto.

The input interface 350 may receive input from a user and may provide the controller 250 with the corresponding input.

In detail, the input interface 350 is an inputter that inputs a heating intensity desired by the user or driving time of the induction heating and wireless power transmitting apparatus and may be variously implemented as a physical button or a touch panel.

The input interface 350 may also include, for example, a power button, a lock button, a power level control button (+,−), a timer control button (+,−), a charging mode button, and the like.

The input interface 350 may also provide the controller 250 with the received input information and the controller 250 may variously drive the induction heating and wireless power transmitting apparatus based on the input information received from the input interface 350. Examples thereof are described below.

When the user touches the power button provided in the input interface 350 for a predetermined period of time, while the induction heating and wireless power transmitting apparatus is not driven, the induction heating and wireless power transmitting apparatus may be driven. By contrast, when the user touches the power button for a predetermined period of time j while the induction heating and wireless power transmitting apparatus are driven, driving of the induction heating and wireless power transmitting apparatus may be terminated.

Further, when the user touches the lock button for a predetermined period of time, all other buttons may become inoperable. Subsequently, if the user touches the lock button again for a predetermined period of time, all other buttons may be operated.

When the user touches the power level control button (+, −) while the power is supplied, a current power level of the induction heating and wireless power transmitting apparatus may be displayed numerically on the input interface 350. The controller 250 may also determine that the driving mode of the induction heating and wireless power transmitting apparatus is the induction heating mode by the touch of the power level control button (+, −). The controller 250 may adjust frequency for switching operation of each of the first inverter IV1 and the second inverter IV2 to correspond to the input power level.

Further, the user may also set the driving time of the induction heating and wireless power transmitting apparatus by touching the timer control button (+, −). The controller 250 may terminate the driving of the induction heating and wireless power transmitting apparatus when the driving time set by the user elapses.

In this case, when the induction heating and wireless power transmitting apparatus operates in the induction heating mode, the driving time of the induction heating and wireless power transmitting apparatus set using the timer control button (+, −) may be the heating time of the object. Further, when the induction heating and wireless power transmitting apparatus operates in the wireless power transmission mode, the driving time of the induction heating and wireless power transmitting apparatus set using the timer control button (+, −) may be charging time of the object.

In some examples, when the user touches the charging mode button, the induction heating and wireless power transmitting apparatus may be driven in the wireless power transmission mode.

In this case, the controller 250 may receive apparatus information related to the object through communication with the corresponding object seated in a driving area (i.e., above the working coil). The apparatus information received from the object may include, for example, object information on types of objects, the charging mode, and an amount of required power.

For example, the controller 250 may determine types of objects based on the received apparatus information, and may determine the charging mode of the object based on the received apparatus information.

In some examples, the charging mode of the object may include a normal charging mode and a fast charging mode.

For example, the controller 250 may adjust the frequency of at least one of the first inverter IV1 and the second inverter IV2 based on the determined charging mode. For example, in the fast charging mode, the controller 250 may adjust the frequency such that a greater magnitude of resonance current is applied to the working coil through the switching operation of each of the inverters. In another, in the normal charging mode, the controller 250 may adjust the frequency to generate a resonance current having a magnitude that is less than the magnitude of resonance current in the fast charging mode.

In some implementations, the charging mode of the object may be input by the user through the input interface 350.

As described above, the induction heating and wireless power transmitting apparatus 1 may include the above-described features and configurations.

The above-mentioned features and configurations of the induction heating and wireless power transmitting apparatus 1 are described below in more detail with reference to FIGS. 3 and 4.

Figure 3:
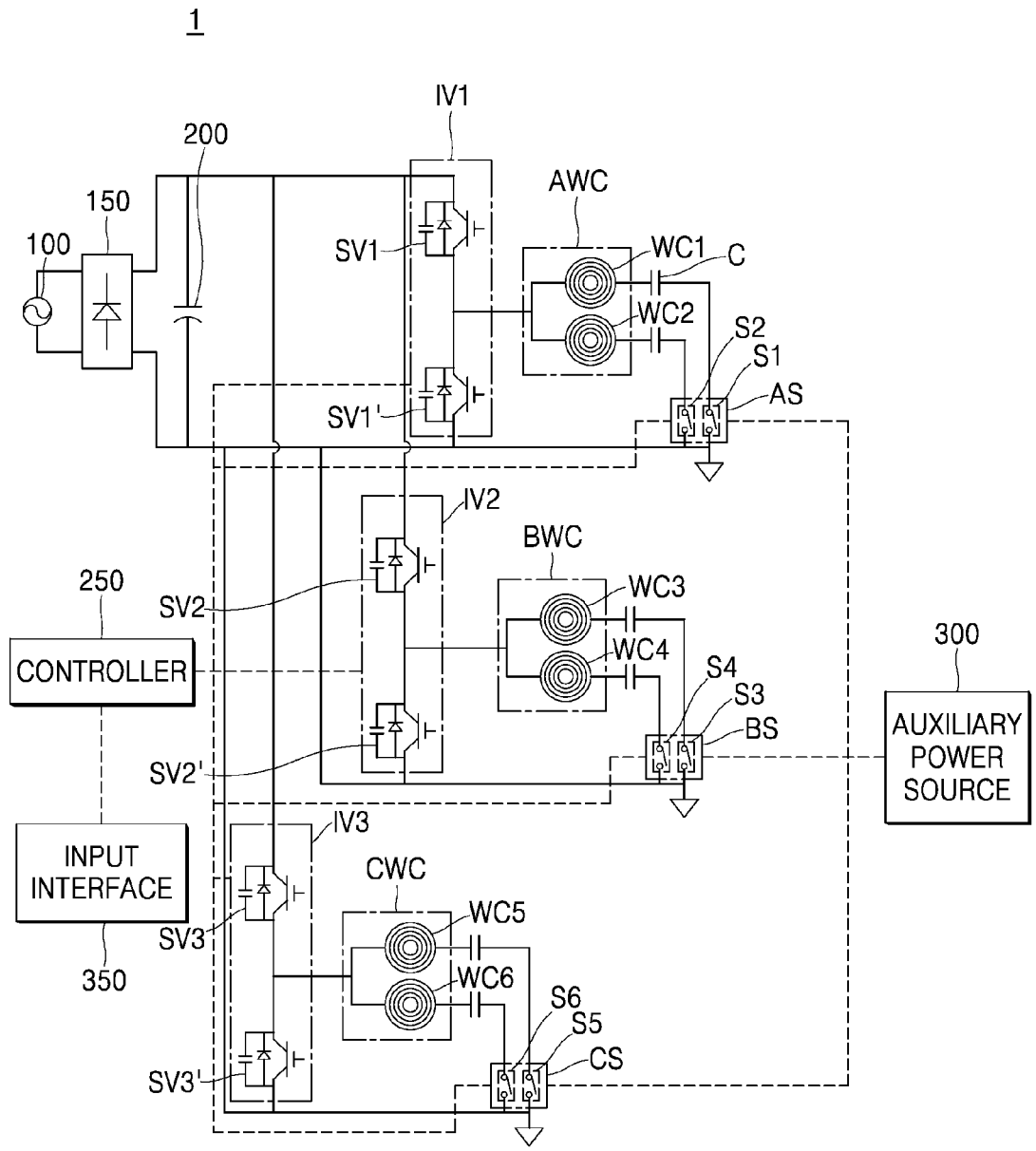
FIG. 3 is a circuit diagram showing the induction heating and wireless power transmitting apparatus in FIG. 2.

FIG. 3 is a circuit diagram showing the induction heating and wireless power transmitting apparatus in FIG. 2 in detail. FIG. 4 is a schematic diagram showing an example arrangement of example working coils in FIG. 3.

In some examples, the induction heating and wireless power transmitting apparatus shown in FIG. 3 includes the same configuration and feature as the induction heating and wireless power transmitting apparatus shown in FIG. 2, but the number and names of some components are changed for convenience of description.

Figure 4:
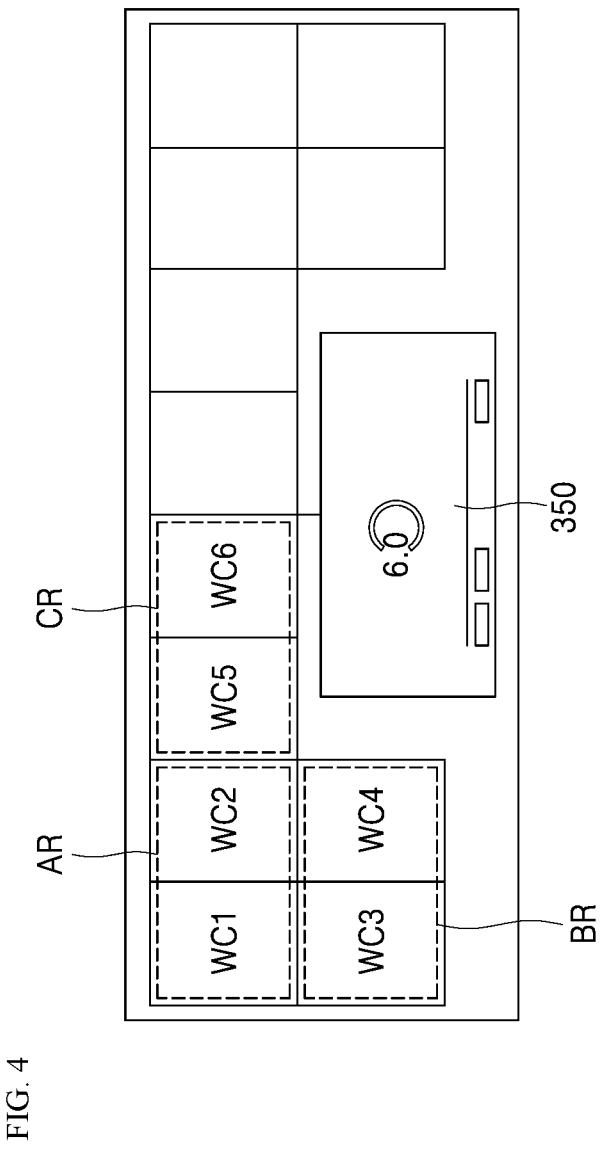
FIG. 4 is a schematic diagram showing an example arrangement of example working coils of the apparatus in FIG. 3.

Further, as shown in FIG. 4, only the working coils included within a first half of an entire area (a zone-free area) is shown in FIG. 3. FIG. 3 may further include an additional inverter, a working coil portion, a working coil, a detection group, a detector, a semiconductor switch portion, and a semiconductor switch to form a second half thereof.

For convenience of description, examples of the inverter, the working coil portion, the working coil, the detection group, the detector, the semiconductor switch portion, and the semiconductor switch in FIG. 3 are described.

Referring to FIG. 3, the induction heating and wireless power transmitting apparatus 1 may include a power source 100, a rectifier 150, a DC link capacitor 200, a first inverter IV1 to a third inverter IV3, a first working coil portion AWC, a second working coil portion BWC, and a third working coil portion CWC, a first semiconductor switch portion AS, a second semiconductor switch portion BS, and a third semiconductor switch portion CS, a controller 250, an auxiliary power source 300, and an input interface 350.

In some examples, the number of each of inverters, working coil portions, working coils, semiconductor switch portions, and semiconductor switches is not limited to the number shown in FIG. 3 and may be changed.

Specifically, the power source 100 may output AC power and provide the rectifier 150 with the AC power. The rectifier 150 may convert, into DC power, the AC power received from the power source 100 and may provide the DC link capacitor 200 with the DC power.

The DC link capacitor 200 may be connected to the rectifier 150 electrically in parallel.

In detail, the DC link capacitor 200 may be connected to the rectifier 150 electrically in parallel to receive a DC voltage from the rectifier 150. The DC link capacitor 200 may also be, for example, a smoothing capacitor and may reduce the ripple of the received DC voltage.

In some examples, the DC link capacitor 200 may receive the DC voltage from the rectifier 150 and the DC voltage may be applied to a first end thereof and a second thereof may be grounded based on a potential difference from the first end thereof.

The DC power (or the DC voltage) rectified by the rectifier 150 and reduced in ripple by the DC link capacitor 200 may also be supplied to at least one of the first inverter IV1 to the third inverter IV3.

In some examples, the first inverter IV1 may include two switching elements SV1 and SV1', the second inverter IV2 may include two switching elements SV2 and SV2', and the third inverter IV3 may include two switching elements SV3 and SV3'.

The switching elements included in each of inverters IV1 to IV3 are also alternately turned on and off based on the switching signal received from the controller 250 to convert the DC power into high-frequency AC current (i.e., the resonance current) and the converted high-frequency AC may be provided to the working coil.

For example, the resonance current converted through the switching operation of the first inverter IV1 may be provided to the first working coil portion AWC and the resonance current converted through the switching operation of the second inverter IV2 may be provided to the second working coil portion BWC. The resonance current converted through the switching operation of the third inverter IV3 may also be provided to the third working coil portion CWC.

In some implementations, the resonance current generated by the first inverter IV1 may be applied to at least one of the working coils (e.g., the first working coil WC1 and the second working coil WC2) included in the first working coil portion AWC. The resonance current generated by the second inverter IV2 may be applied to at least one of the working coils (e.g., the third working coil WC3 and the fourth working coil WC4) included in the second working coil portion BWC. The resonance current generated by the third inverter IV3 may also be applied to at least one of the working coils (e.g., the fifth working coil WC5 and the sixth working coil WC6) included in the third working coil portion CWC.

The working coils WC1 and WC2 included in the first working coil portion AWC are electrically connected to each other in parallel and the working coils WC3 and WC4 included in the second working coil portion BWC are also electrically connected to each other in parallel. The working coils WC5 and WC6 included in the third working coil portion CWC are also electrically connected to each other in parallel.

Accordingly, as shown in FIG. 4, the working coils WC1 and WC2 included in the first working coil portion AWC may be grouped and disposed in area A (area AR) and the working coils WC3 and WC4 included in the second working coil portion BWC may be grouped and disposed in area B (area BR). The working coils WC5 and WC6 included in the third working coil portion CWC may also be grouped and disposed in area C (area CR).

In some implementations, the working coils may be disposed in the remaining empty space and the input interface 350 may also be disposed at a position other than the position shown in FIG. 4.

Referring back to FIG. 3, the first semiconductor switch portion AS may be electrically connected to the first working coil portion AWC and the second semiconductor switch portion BS may be electrically connected to the second working coil portion BWC. The three semiconductor switch portion CS may be electrically connected to the third working coil portion CWC.

In detail, the first semiconductor switch portion AS includes two semiconductor switches (e.g., the first semiconductor switch S1 and the second semiconductor switch S2) and the two semiconductor switches S1 and S2 are connected to the two working coils WC1 and WC2, respectively, included in the first working coil portion AWC to turn on or off the two working coils WC1 and WC2.

A first end of each of the two semiconductor switches S1 and S2 is electrically connected to one of the two working coils WC1 and WC2 and a second end of each of the two semiconductor switches S1 and S2 is electrically connected to a second end (i.e., a ground terminal) of the DC link capacitor 200.

Further, the second semiconductor switch portion BS includes two semiconductor switches S3 and S4 (the third semiconductor switch and the fourth semiconductor switch) and the two semiconductor switches S3 and S4 may be electrically connected to the two working coils WC3 and WC4, respectively, included in the second working coil portion BWC to turn on or off the two working coils WC3 and WC4.

A first end of each of the two semiconductor switches S3 and S4 is connected to one of the two working coils WC3 and WC4 and a second end of each of the two semiconductor switches S3 and S4 is electrically connected to a second end (i.e., a ground terminal) of the DC link capacitor 200.

Further, the third semiconductor switch portion CS includes two semiconductor switches S5 and S6 and each of the two semiconductor switches S5 and S6 may be electrically connected to two working coils WC5 and WC6 included in the third working coil portion CWC to turn on or off the two working coils WC5 and WC6.

A first end of each of the two semiconductor switches S5 and S6 is electrically connected to the two working coils WC5 and WC6 and a second end of each of the two semiconductor switches S5 and S6 is electrically connected to a second end (i.e., the ground terminal) of the DC link capacitor 200.

That is, the second end of each of the first semiconductor switch portion, the second semiconductor switch portion BS, and the third semiconductor switch portion CS may be electrically connected to a second end (i.e., the ground terminal) of the DC link capacitor 200, and thus, the auxiliary power source 300 may supply the power to all semiconductor switches through one output terminal.

In some examples, when a semiconductor switch is electrically connected between an inverter and a working coil portion, emitters of semiconductor switches float each other, thereby increasing the number of output terminals of the auxiliary power source 300 by the number of semiconductor switches. As a result, the number of pins of the auxiliary power source 300 may also be increased, thereby resulting in a greater circuit volume.

In some implementations, when the semiconductor switches are all electrically connected to the ground terminal (i.e., the second end of the DC link capacitor 200), the emitters of the semiconductor switches may not float but may be common. Therefore, the auxiliary power source 300 may supply the power to all of the semiconductor switches through one output terminal. The number of pins of the auxiliary power source 300 may also be reduced compared to the emitters of the semiconductor switches being floating, and the circuit volume may be reduced.

In some implementations, the second end of each of all semiconductor switches may be electrically connected to the first end of the DC link capacitor 200 (i.e., a portion to which the DC voltage is applied). Further, when the auxiliary power source 300 has greater single output capacity (i.e., greatly out of the predetermined reference capacity), the second end of each of the semiconductor switches included in a first portion of semiconductor switch is electrically connected to the second end (i.e., the ground terminal) of the DC link capacitor 200 and the second end of each of the semiconductor switches in a second portion of the semiconductor switch portion may be electrically connected to the first end of the DC link capacitor (i.e., a portion to which the DC voltage is applied).

For convenience of description, an example of all of the semiconductor switches being electrically connected to the ground terminal (i.e., the second end of the DC link capacitor 200) is described.

In some examples, the induction heating and wireless power transmitting apparatus 1 may further include a resonance capacitor C electrically connected between the working coil and the semiconductor switch.

When a voltage is applied through the switching operation of the inverter (e.g., the first inverter IV1), the resonance capacitor C resonates. Further, when the resonance capacitor C resonates, an amount of current flowing through the working coil WC1 electrically connected to the resonance capacitor C is increased.

The eddy current is induced to the object disposed above the working coil electrically connected to the resonance capacitor C through the above process.

In some examples, the controller 250 may control operation of each of the first inverter IV1 to the third inverter IV3 and the first semiconductor switch portion AS, the second semiconductor switch BS, and the third semiconductor switch portion CS.

The controller 250 may also detect the resonance current flowing through at least one of the working coils WC1 to WC6 included in the first working coil portion AWC, the second working coil portion BWC, and the third working coil portion AWC, BWC, and CWC and may determine, based on the detected value, which working coil the object is disposed.

That is, the controller 250 may control operation of each of the first inverter IV1 to the third inverter IV3 and the semiconductor switches S1 to S6 included in the first semiconductor switch portion AS, the second semiconductor switch portion BS, and the third semiconductor switch portion CS to detect which working coil the object is disposed, among the working coils WC1 to WC6 included in the first working coil portion AWC to the third working coil portion CWC.

One or more examples of the above-described induction heating and wireless power transmitting apparatus 1 are described below with reference to FIGS. 5 to 13 to describe an object detection and output control method of the induction heating and wireless power transmitting apparatus 1 in detail.

Figure 5:
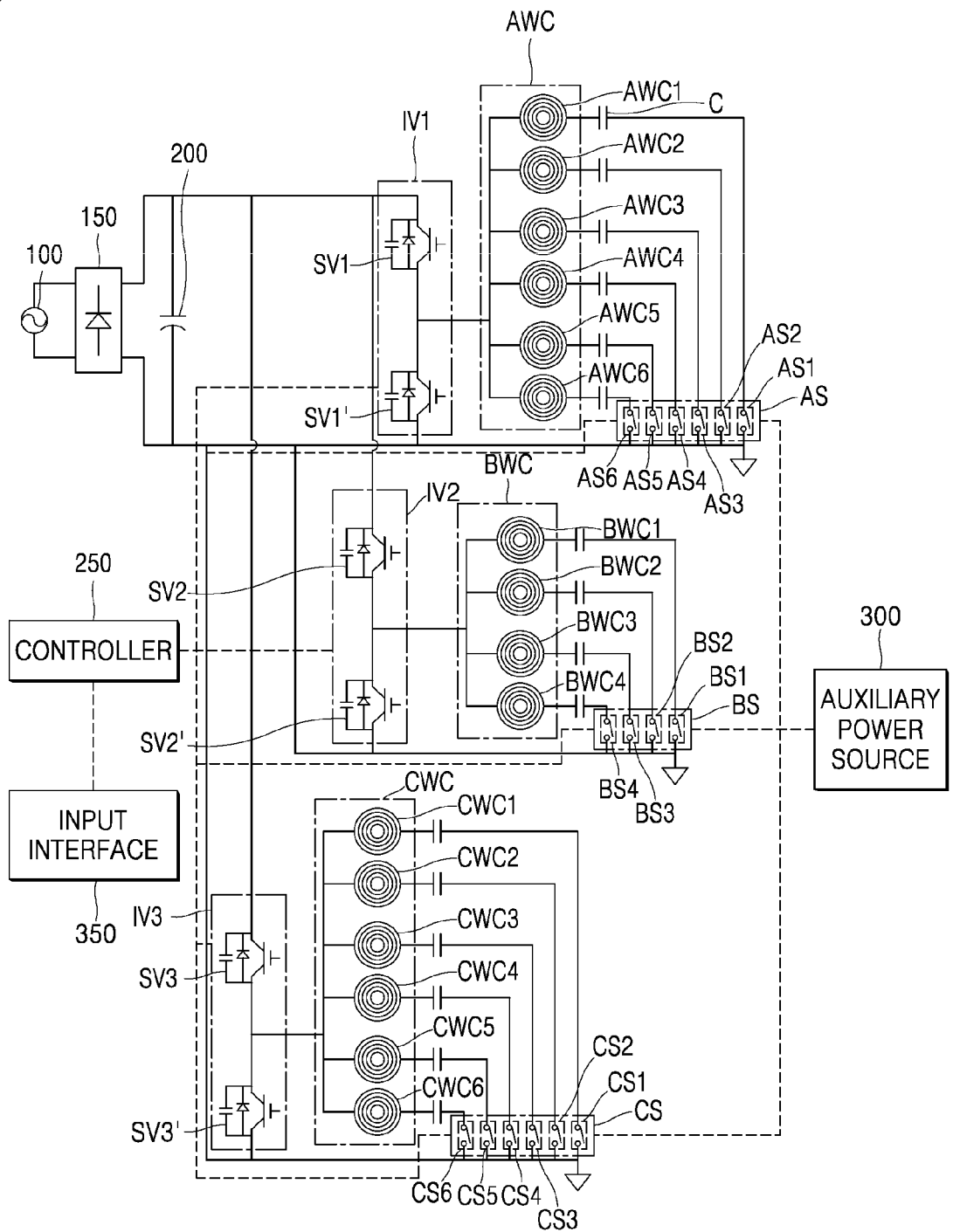
FIG. 5 is a circuit diagram showing an example of the induction heating and wireless power transmitting apparatus in FIG. 2.
Figure 6:
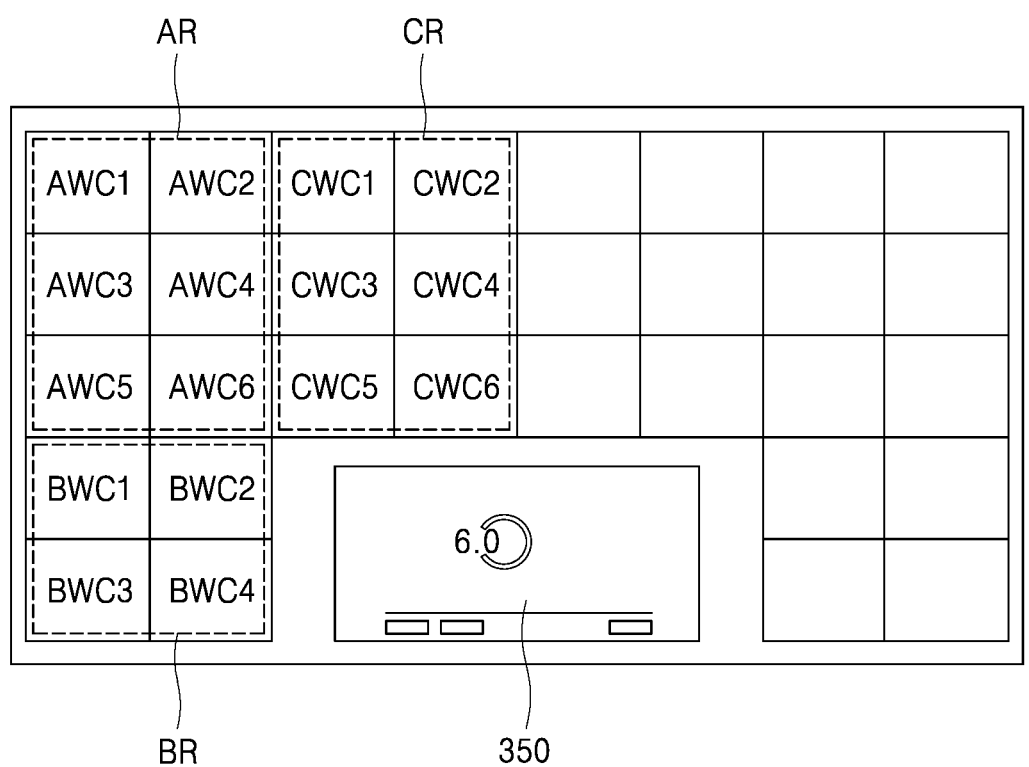
FIG. 6 is a schematic diagram showing an example arrangement of example working coils of the apparatus in FIG. 5.
Figure 7:
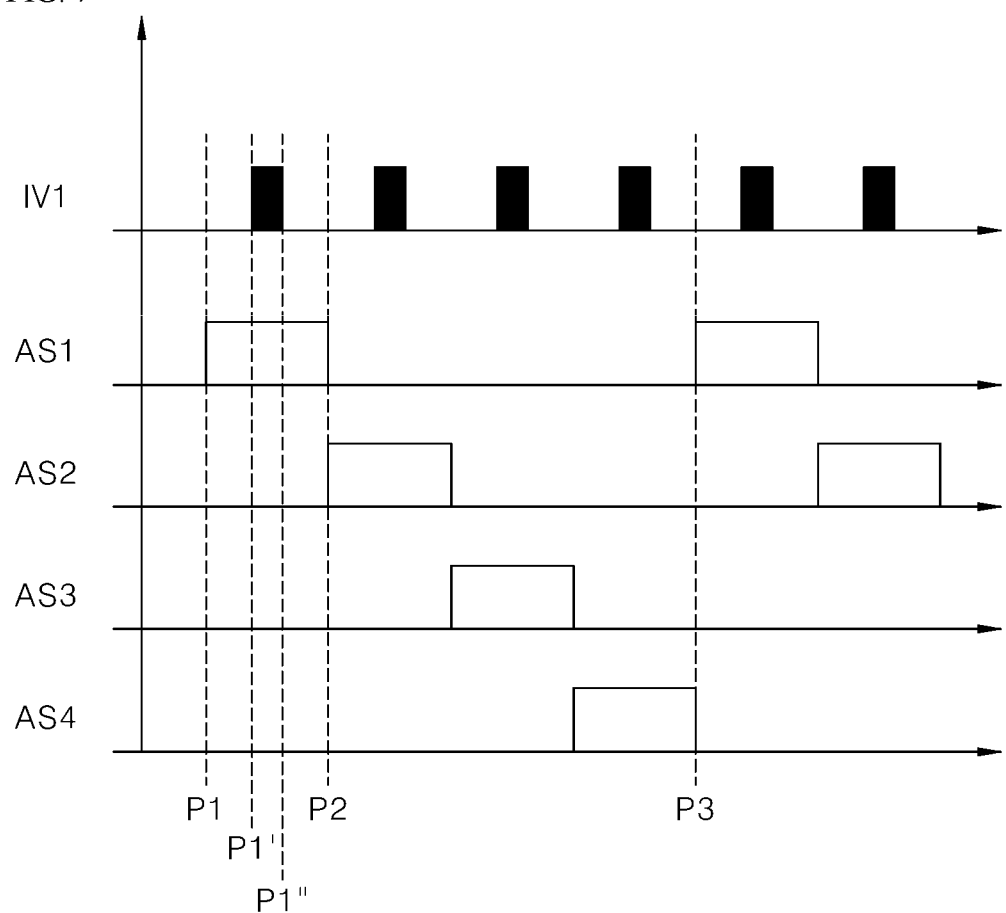
FIGS. 7 and 8 are schematic diagrams showing examples of an object detection method of the induction heating and wireless power transmitting apparatus in FIG. 5.
Figure 8:
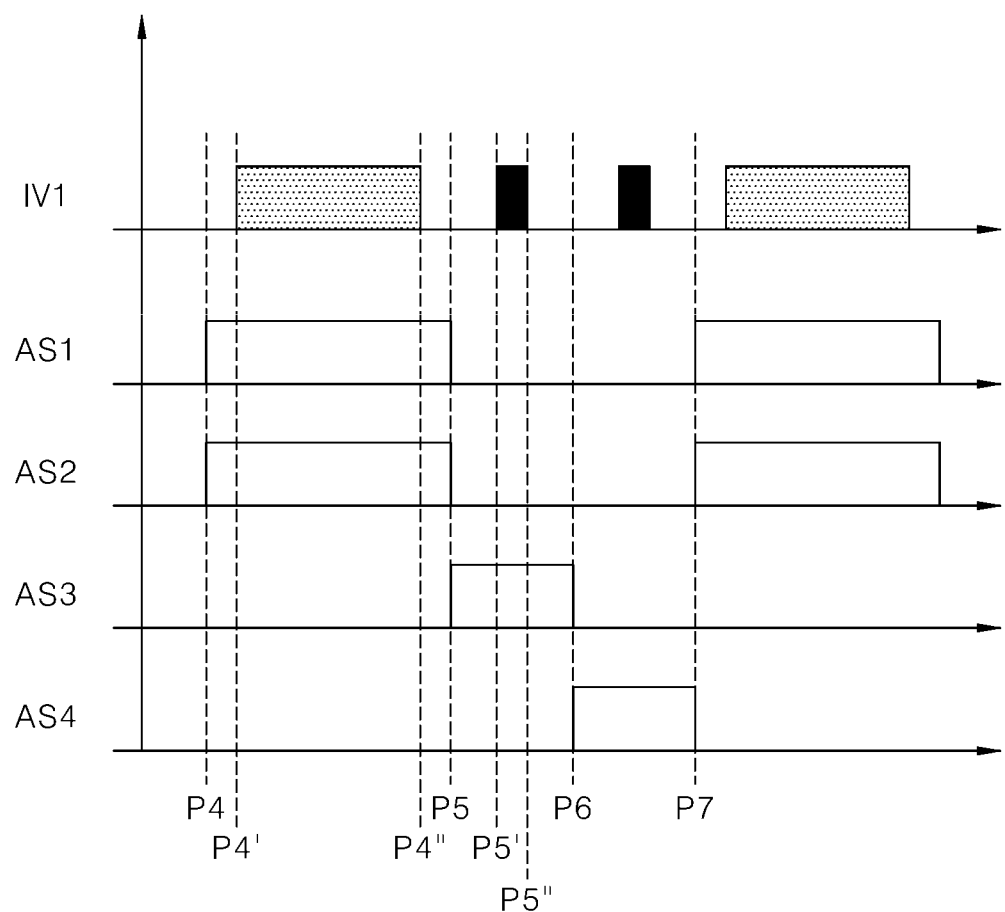
Figure 9:
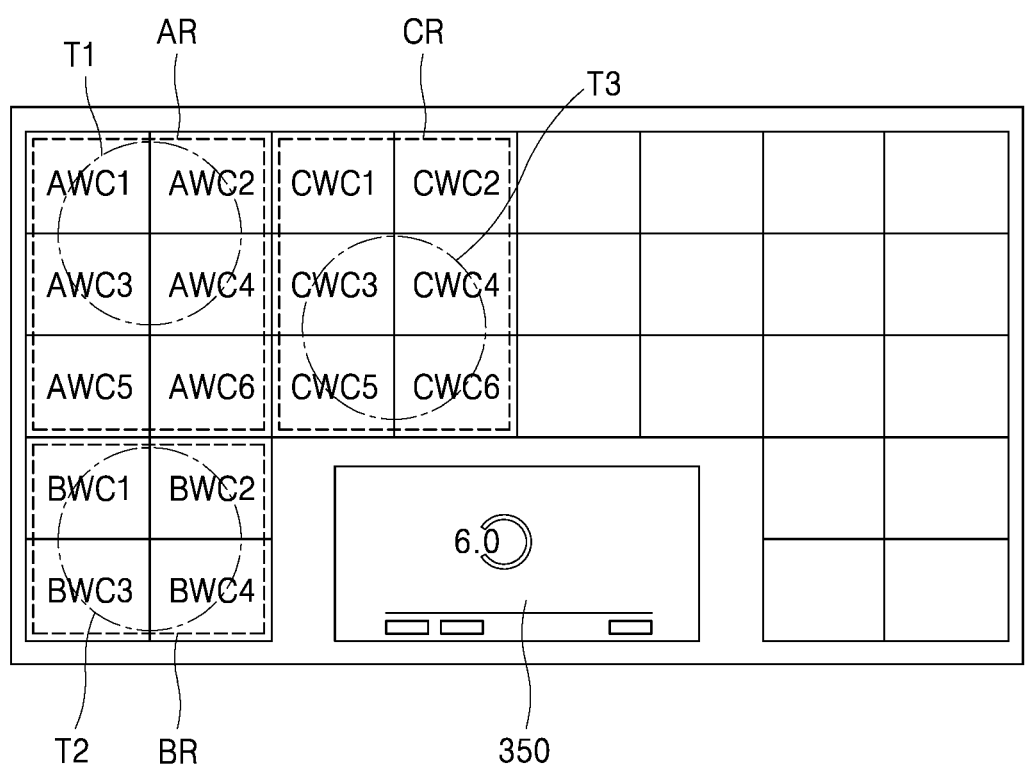
FIG. 9 is a schematic diagram showing an example of positions of example objects disposed above the working coil in FIG. 5.
Figure 10:
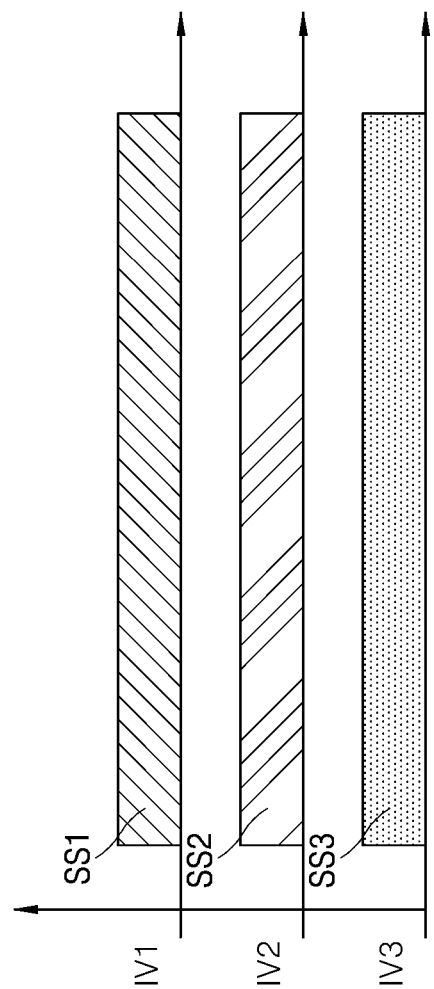
FIG. 10 is a schematic diagram showing an example of an output control method of an induction heating and wireless power transmitting apparatus based on the positions of the objects in FIG. 9.
Figure 11:
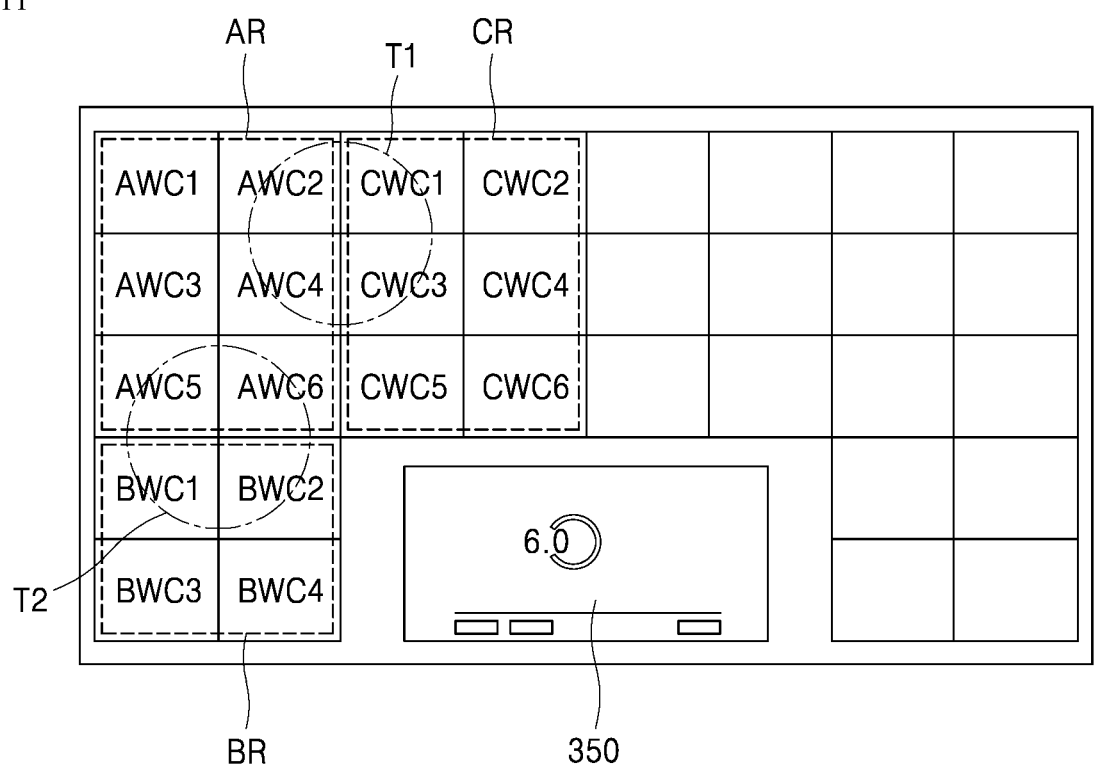
FIG. 11 is a schematic diagram showing another example of positions of example objects disposed above the working coils in FIG. 5.
Figure 12:
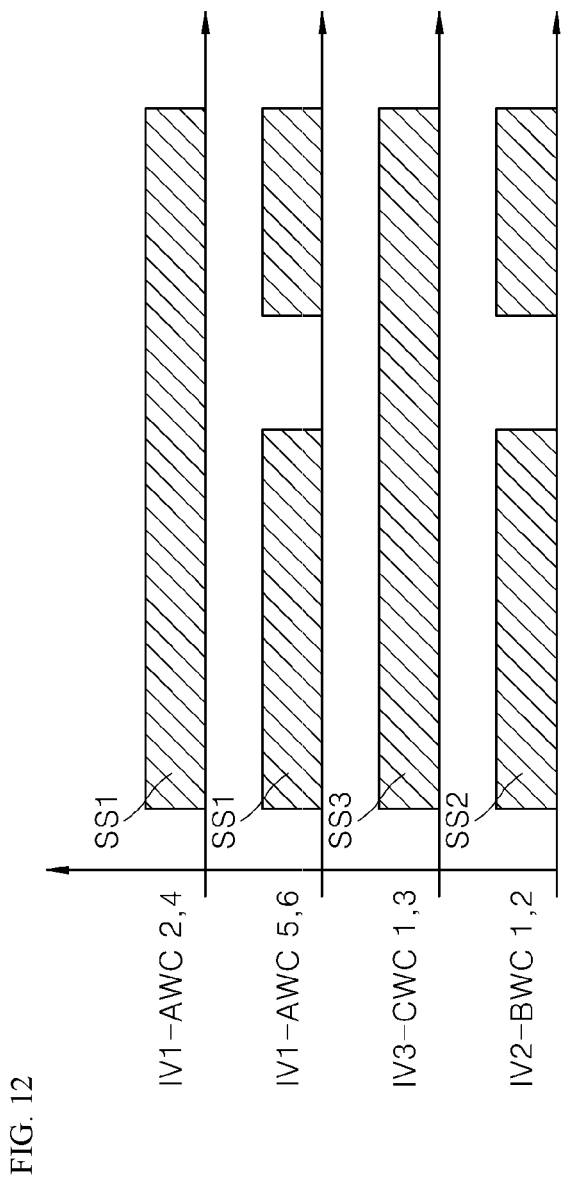
FIG. 12 is a schematic diagram showing another example of an output control method of an induction heating and wireless power transmitting apparatus based on the positions of the objects in FIG. 11.

FIG. 5 is a circuit diagram showing an example of the induction heating and wireless power transmitting apparatus in FIG. 2. FIG. 6 is a schematic diagram showing an example arrangement of the working coils in FIG. 5. FIGS. 7 and 8 are schematic diagrams showing an example of an object detection method of the induction heating and wireless power transmitting apparatus in FIG. 5. FIG. 9 is a schematic diagram showing an example of positions of the objects disposed above the working coil in FIG. 5. FIG. 10 is a schematic diagram showing an example of an output control method of an induction heating and wireless power transmitting apparatus based on the positions of the objects in FIG. 9. FIG. 11 is a schematic diagram showing another example of positions of the objects disposed above the working coils in FIG. 5. FIG. 12 is a schematic diagram showing another example of an output control method of an induction heating and wireless power transmitting apparatus based on positions of the objects in FIG. 11. FIG. 13 is a schematic diagram showing another example of an output control method of an induction heating and wireless power transmitting apparatus based on positions of the objects in FIG. 11.

In some examples, the induction heating and wireless power transmitting apparatus shown in FIG. 5 includes the same configuration and feature as the induction heating and wireless power transmitting apparatus shown in FIG. 3, but the number and names of some components may be changed to be used to describe the optimal example. Referring to FIG. 5, an optimal example of the induction heating and wireless power transmitting apparatus 1 may include a power source 100, a rectifier 150, a DC link capacitor 200, and a first inverter IV1 to a third inverter IV3, a first working coil portion to a third working coil portion AWC, BWC, and CWC, a first semiconductor switch portion AS, a second semiconductor switch portion BS, and a third semiconductor switch portion CS, a controller 250, an auxiliary power source 300, and an input interface 350.

For example, in the optimal example of the induction heating and wireless power transmitting apparatus 1, the first working coil portion AWC may include six working coils AWC1 to AWC6, the second working coil portion BWC may include four working coils BWC1 to BWC4, and the third working coil portion CWC may include six working coils CWC1 to CWC6. Further, the first semiconductor switch portion AS may include six semiconductor switches AS1 to AS6 and the second semiconductor switch portion BS may include four semiconductor switches BS1 to BS4, and the third semiconductor switch portion CS may include six semiconductor switches CS1 to CS6 to correspond to the number of working coils.

In some examples, as shown in FIG. 6, the working coils AWC1 to AWC6 included in the first working coil portion AWC may be grouped and disposed in the group A (area AR) and the working coils BWC1 to BWC4 included in the second working coil portion BWC may be grouped and disposed in the area B (area BR). The working coils CWC1 to CWC6 included in the third working coil portion CWC may also be grouped and disposed in area C (area CR).

In some implementations, the working coils may be disposed in the remaining empty space and the input interface 350 may also be disposed at a position other than the position shown in FIG. 6.

The object detection method of the induction heating and wireless power transmitting apparatus 1 is described below with reference to FIGS. 5, 7, and 8.

In some examples, for convenience of description, an example object detection method is described in the area A (area AR in FIG. 6) in which the first working coil portion AWC is disposed. Further, it is described based on the assumption that the first working coil portion AWC includes four working coils AWC1 to AWC4 and the first semiconductor switch portion AS includes four semiconductor switches AS1 to AS4 electrically connected to the four working coils, respectively.

Referring to FIGS. 5 and 7, the controller 250 may provide the first inverter IV1 with N pulses for each predetermined period of time to detect the position of the object (where N is any one of 1, 2, and 3, and if N is 1, one pulse shot may be provided as the switching signal of the first inverter IV1).

When the first inverter IV1 receives N pulses from the controller 250, the first inverter IV1 may be turned on and off, and thus, free resonance may be generated by a circuit including the first working coil portion AWC.

When the controller 250 provides continuous pulses (i.e., four or more pulses) rather than N pulses, a problem may occur in a standby power. Thus, the controller 250 periodically provides the first inverter IV1 with N pulses.

In some examples, for convenience of explanation, example case in which N pulses are one pulse (i.e., a single pulse) is described below.

In some examples, the controller 250 may sequentially turn on or off the four semiconductor switches AS1 to AS4 based on each single pulse until the position of the object is detected.

That is, the controller 250 may turn on the first semiconductor switch AS1 at a first time point P1 and a first delay during a predetermined period of time (between the time point P1 and a time point P1') elapses after the turn-on of the first semiconductor switch AS1, a single pulse may be provided to the first inverter IV1. A first delay elapse time is taken because the first semiconductor switch AS1 takes a predetermined period of time to be stabilized after being turned on.

Subsequently, after the single pulse is provided to the first inverter IV1, a second delay for a predetermined period of time (between a time point P1" to a time point P2) may elapse. The second delay elapse time may be applied so that a predetermined period of time may be taken to perform signal processing with respect to the single pulse provided to the first inverter IV1 and the detection operation with respect to the object.

When the object is not detected after the first time point P1 and before the second time point P2, the first semiconductor switch AS1 is turned off and the second semiconductor switch AS2 is turned on at the second time P2 to provide the first inverter IV with the single pulse again.

The controller 250 may also sequentially repeat the above-mentioned process with respect to the third semiconductor switch AS3 and the fourth semiconductor switch AS4 until the object is detected.

When the object is not detected even until the third time point P3, the controller 250 may turn off the fourth semiconductor switch AS4 and may turn on the first semiconductor switch AS1 at the third time point P3, and may provide the first inverter IV1 with the single pulse to repeat the above-mentioned processes again.

In some examples, when the single pulse is provided to the first inverter IV1 after the first semiconductor switch AS1 is turned on, the resonance current flows only through the first working coil AWC1 and the controller 250 detects attenuation degree of the resonance current flowing through the first working coil AWC1 to detect whether the object is disposed above the first working coil AWC1.

In detail, when the object is disposed above the first working coil AWC1, overall resistance may be increased due to the resistance of the object, which may increase attenuation of the resonance current flowing through the first working coil AWC1.

The controller 250 may detect the resonance current flowing through the first working coil AWC1 as described above and may detect whether the object is disposed above the first working coil AWC1 based on the detected value.

In some examples, the controller 250 may compare a first attenuation degree of the resonance current generated in the first working coil with a second attenuation degree of the resonance current generated in the second working coil, and based on the first attenuation degree being greater than the second attenuation degree, determine that the object is disposed above the first working coil. In some examples, the controller 250 may compare a magnitude of the resonance current generated in the first working coil with a reference magnitude (e.g., an initial magnitude of the resonance current), and based on the magnitude of the resonance current being less than the reference magnitude, determine that the object is disposed above the first working coil.

As described above, the controller 250 may also detect whether the object is sequentially disposed above the second working coil AWC2 to the fourth working coil AWC4 and may continually repeat the process.

Subsequently, referring to FIGS. 5 and 8, for example, when the object is detected above the first working coil AWC1 and the second working coil AWC2, the controller 250 may turn on the first semiconductor switch AS1 and the second semiconductor switch AS2 at a fourth time point P4 and may provide the first inverter IV1 with the switching signal whose frequency and phase are adjusted to correspond to a power level (i.e., heating intensity or an amount of transmitted power) input by the user.

The resonance current may be applied to the first working coil AWC1 and the second working coil AWC2 through the above configuration and the object disposed above the working coils may be inductively heated or may wirelessly receive the power.

In some implementations, in this case, the controller 250 may provide the first inverter IV1 with the switching signal when a third delay for a predetermined period of time (between a time point P4 to a time point P4') elapses after the first semiconductor switch AS1 and the second semiconductor switch AS2 are turned on. The third delay elapsed time is taken because the first semiconductor switch AS1 and the second semiconductor switch AS2 take a predetermined period of time to be stabilized after being turned on.

In some implementations, the controller 250 may also continually detect whether the object other than the object (i.e., the object disposed above the first working coil AWC1 and the second working coli AWC2) above the working coil that is not driven (i.e., the third working coil AWC3 or the fourth working coil AWC4).

That is, the controller 250 may stop provision of the switching signal to the first inverter IV1 in order to detect whether another object is disposed above the working coil that is not driven.

In detail, the controller 250 stops the provision of the switching signal to the first inverter IV1, and after the elapse of a fourth delay during a predetermined period of time (between a time point P4" and a time point P5), the controller 250 may turn off the first semiconductor switch AS1 and the second semiconductor switch AS2 and may turn on the third semiconductor switch AS3 at a start of the predetermined period of time (for example, between the time point P5 to a time point P7; a number of working coils that are not driven X a period of time corresponding to the predetermined period of time). Subsequently, the controller 250 may provide a single pulse to the first inverter IV1 within a predetermined period of time.

The fourth delay elapse time is taken because it takes a predetermined period of time to perform the signal processing operation with respect to the switching signal provided to the first inverter IV1.

For the same reason as described above, when the controller 250 provides the single pulse to the first inverter IV1 within a predetermined period of time, delays may be provided for a period of time between time point P5 and a time point P5' and a period of time between the time point P5" to a time point P6 before and after the provided time point.

In some implementations, the controller 250 may sequentially turn off or on the third semiconductor switch AS3 and the fourth semiconductor switch AS4 during a predetermined period of time in the same manner as the above-described method to detect another object.

Further, if the another object is not detected above the third working coil AWC3 or the fourth working coil AWC4 until the predetermined period of time (e.g., between the time point P5 to the time point P7) ends, the controller 250 may turn off the fourth semiconductor switch AS4 and may turn on the first semiconductor switch AS1 and the second semiconductor switch AS2 at the end (i.e., the seventh time point P7) of the predetermined period of time. Subsequently, the controller 250 may provide the first inverter IV1 again with the above-mentioned switching signal.

In some examples, as shown in FIG. 8, the third semiconductor switch AS3 is already turned off at the sixth time point P6 and the switching signal provided to the first inverter IV1 after the seventh time point P7 is a switching signal whose frequency and phase are adjusted to correspond to the power level input by the user.

As described above, the controller 250 may continually detect whether another object is disposed above the working coils that are not driven even after the object is detected.

In some implementations, the above-described object detection operation may be performed in the same manner with respect to the first working coil portion AWC as well as the second working coil portion BWC and the third working coil portion CWC.

As described above, the induction heating and wireless power transmitting apparatus 1 improve the object detection speed and algorithm by separating a plurality of working coils AWC1 to AWC6, BWC1 to BWC4, and CWC1 to CWC6 independently through the semiconductor switch AS1 to AS6, BS1 to BS4, and CS1 to CS6 and the controller 250, and turning on or off each of the divided plurality of working coils AWC1 to AWC6, BWC1 to BWC4, and CWC1 to CWC6 at high speed. Further, the object detection operation may be continually operated with respect to the working coil that is not driven, thereby improving reliability in the object detection.

In some examples, as described above, the controller 250 may provide a switching signal to control the operation of each of inverters.

That is, the controller 250 may provide a first switching signal to the first inverter IV1 to control the operation of the first inverter IV1, may provide the second inverter IV2 with the second switching signal to control the operation of the second inverter IV2, and may provide the third inverter IV3 with the third switching signal to control the operation of the third inverter IV3.

The frequency and the phase of each of the first switching signal to the third switching signal may be adjusted based on which working coil the object is disposed, among the working coils AWC1 to AWC6, BWC1 to BWC4, and CWC1 to CWC6 included in the first working coil portion AWC, the second working coil portion BWC, and the third working coil portion CWC.

An example of the output control method of the induction heating and wireless power transmitting apparatus 1 is described below with reference to FIGS. 5, 9, and 10.

In detail, the object may include a plurality of objects and each of the objects may be disposed above one of the working coil portions.

That is, the object may include, for example, a first object T1 disposed above the first working coil portion AWC (i.e., in area A (area AR)), a second object T2 disposed above the second working coil portion BWC (i.e., in area B (area BR)), and a third object T3 disposed above the third working coil portion CWC (i.e., in area C (area CR)).

In other words, FIG. 9 shows each of the first object T1, the second object T2, and the third object T3 being not disposed over a plurality of areas but disposed only in a single area.

In this case, the controller 250 may releases the synchronization of a timer provided therein and may independently (i.e., individually) adjust the frequency and the phase of each of switching signals to correspond to the power level required by each of objects (i.e., the power level required for heating or charging each of objects).

That is, the controller 250 may adjust the frequency and the phase of the first switching signal SS1 to correspond to the power level (e.g., 1500 W) required by the first object T1, may adjust the frequency and the phase of the second switching signal SS2 to correspond to the power level (e.g., 1000 W) required by the second object T2, and may adjust the frequency and the phase of the third switching signal SS3 to correspond to the power level (e.g., 1300 W) required by the third object T3.

Accordingly, the controller 250 may adjust the frequency and the phase of each switching signal independently (i.e., through desynchronization) even if the power levels required by the respective objects are different from one another, thereby satisfying each of required power levels.

The controller 250 may also provide the first inverter to the third inverter IV3 with the first switching signal SS1 to the third switching signal SS3 whose frequencies and phases are adjusted independently as shown in FIG. 10.

Another example of the output control method of the induction heating and wireless power transmitting apparatus 1 is described below with reference to FIGS. 5, 11, and 12.

In detail, the object may include a plurality of objects and each of the objects may be disposed above the plurality of working coil portions.

That is, for example, the object may include a first object T1 disposed above the first working coil portion AWC and the third working coil CWC (i.e., AWC2 and AWC4 of the area A (area AR) and CWC1 and CWC3 of the area C (area CR)) and a second object T2 disposed above the first working coil portion AWC and the second working coil portion BWC (i.e., AWC5 and AWC6 of the area A (area AR) and BWC1 and BWC2 of the area B (area BR)).

In other words, FIG. 11 shows each of the first object T1 and the second object T2 being disposed over a plurality of areas.

Specifically, for example, when it is assumed that the power level required by the first object T1 is greater than the power level required by the second object T2, the controller 250 may synchronize the frequencies and the phases of the first switching signal SS1 to the third switching signal SS3 to correspond to the power level required by the first object T1 as shown in FIG. 12.

Subsequently, the controller 250 may provide the synchronized first switching signal SS1 to third switching signal SS3 to the first inverter IV1 to the third inverter IV3, respectively.

In this case, the controller 250 may control the semiconductor switch as follows.

The controller 250 may turn on the semiconductor switches AS2, AS4, AS5, and AS6 of the first semiconductor switch portion AS corresponding to the positions of the first object T1 and the second object T2, and subsequently, the controller 250 may provide the first inverter IV1 with the first switching signal SS1.

However, the controller 250 may turn off, after turning on the semiconductor switches AS5 and AS6 corresponding to the position of the second object T2 and may be turned on again to satisfy the power level required by the second object T2.

That is, the frequency and the phase of the first switching signal SS1 are set to correspond to the power level (e.g., 1300 W) required by the first object T1, and thus, the output (e.g., 1300 W) of each of the working coils AWC5 and AWC6 corresponding to the position of the second object T2 may be higher than the power level (e.g., 1000 W) required by the second object T2.

Therefore, in order to decrease the output of each of the working coils AWC5 and AWC6 to 1000 W, the working coils AWC5 and AWC6 are turned off for a specific period of time and then turned on again.

As a result, the output of each of the working coils AWC2 and AWC4 corresponding to the position of the first object T1 is adjusted to the power level required by the first object T1. The output of each of the working coils AWC5 and AWC6 corresponding to the position of the second object T2 may be adjusted to the power level required by the second object T2.

In the same principle, the controller 250 turns on the semiconductor switches BS1 and BS2 of the second semiconductor switch portion BS corresponding to the position of the second object T2 and provides the second inverter IV2 with the second switching signal SS2, and may turn off the semiconductor switches BS1 and BS2 for a specific period of time, and subsequently, may turn on the semiconductor switches BS1 and BS2 to satisfy the power level required by the second object T2.

The output of each of the working coils BWC1 and BWC2 corresponding to the position of the second object T2 may be adjusted to the power level required by the second object T2 through the above configuration.

The controller 250 also turns on the semiconductor switches CS1 and CS3 of the third semiconductor switch portion CS corresponding to the position of the first object T1, and subsequently, the controller 250 may provide the third inverter IV3 with the third switching signal SS3.

The output of each of the working coils CWC1 and CWC3 corresponding to the position of the first object T1 may be adjusted to the power level required by the first object T1 through the above configuration.

That is, when the power levels required by objects are different from one another and the object is disposed over a plurality of areas, the controller 250 synchronizes the frequencies and the phases of the switching signals and controls the turn-on and turn-off of the semiconductor switch to adjust the output of each of the working coils.

In some implementations, in addition to the above-described method, the controller 250 may adjust the power level by applying a different pulse width (Duty) to each of the switching signals after the frequencies and the phases of the switching signals are synchronized.

In some examples, the above-described two power level adjustment methods may be used separately, but may be used together depending on load conditions (e.g., a size and a material of the object, and output) when the synchronization control of the switching signal is desired.

Another example of the output control method of the induction heating and wireless power transmitting apparatus 1 is described below with reference to FIGS. 5, 11, and 13.

In some examples, the following description relates to a method of controlling output with respect to the case shown in FIG. 11 through a different method from the method shown in FIG. 12.

Specifically, for example, based on the assumption that the power level required by the first object T1 is higher than the power level required by the second object T2, the controller 250 may synchronize the frequencies and the phases of the first switching signal SS1 and the third switching signal SS3 to correspond to the power level required by the first object T1 as shown in FIG. 13.

Subsequently, the controller 250 may provide the first inverter IV1 and the third inverter IV3 with the synchronized first switching signal SS1 and third switching signal SS3, respectively.

The controller 250 also adjusts the frequency and the phase of the second switching signal SS2 in a separate manner from the first switching signal SS1 and the third switching signal SS3 to correspond to the power level required by the second object T2 and may provide the second inverter IV2 with the adjusted second switching signal SS2.

In this case, the controller 250 may control the semiconductor switch as follows.

The controller 250 may turn on the semiconductor switches AS2 and AS4 of the first semiconductor switch portion AS corresponding to the position of the first object T1 and may turn off the semiconductor switches AS5 and AS6 of the first semiconductor switch portion AS corresponding to the position of the second object T2, and subsequently, the controller 250 may provide the first inverter IV1 with the first switching signal SS1.

That is, the controller 250 may turn on only the semiconductor switches AS2 and AS4 corresponding to the position of the first object T1 requiring a relatively high power level to turn on only the working coils AWC2 and AWC4 corresponding to the position of the first object T1.

The above configuration may stabilize the output of the first working coil portion AWC as well as preventing a possibility of blackout due to a sudden increase in instantaneous power.

However, the output efficiency of the second object T2 may be relatively lower than the output efficiency in the output control method described with reference to FIG. 12.

In some examples, the controller 250 may turn on the semiconductor switches BS1 and BS2 of the second semiconductor switch portion BS corresponding to the position of the second object T2, and subsequently, the controller 250 may provide the second inverter IV2 with the second switching signal SS2.

The output of each of the working coils BWC1 and BWC2 corresponding to the position of the second object T2 may be adjusted to the power level required by the second object T2 through the above configuration.

Further, the controller 250 turns on the semiconductor switches CS1 and CS3 of the third semiconductor switch portion CS corresponding to the position of the first object T1, and subsequently, the controller 250 may provide the third inverter IV3 with the third switching signal SS3.

The output of each of the working coils CWC1 and CWC3 corresponding to the position of the first object T1 may be adjusted to the power level required by the first object T1 through the above configuration.

That is, as shown in FIG. 13, when the power levels required by the objects are different from one another and the object is disposed over a plurality of areas, the controller 250 may control the frequency and the phase of each of the switching signals to correspond to the power levels required by the objects as well as controlling the turn-on and the turn-off of each of the semiconductor switches with respect to the object requiring the high power level, thereby adjusting the output of each of the working coils.

As described above, the induction heating and wireless power transmitting apparatus 1 may improve the output control algorithm by synchronizing or desynchronizing the frequencies and the phases of the switching signals provided to each inverter based on the position of the object. Further, through the improvement in output control algorithm, the heating efficiency or the wireless power transmission efficiency with respect to the object may be improved. Therefore, user satisfaction may be improved.

In some implementations, the induction heating and wireless power transmitting apparatus 1 may include the semiconductor switch and the controller configured to perform the object detection operation and the output control operation, instead of the relay and the object detection circuit, thereby reducing or preventing noise occurring during the switching operation of the relay and improving user satisfaction. Further, the user may quietly use the induction heating and wireless power transmitting apparatus even in the time zone (e.g., at dawn or late night) sensitive to the noise problems, and thus, the user convenience may be improved. Further, the circuit volume may be reduced by eliminating bulky relays and object detection circuits in the circuit, thereby reducing the overall volume of the induction heating and wireless power transmitting apparatuses. Furthermore, space utilization may be improved by reducing the overall volume of the induction heating and wireless power transmitting apparatus.

Various substitutions, changes, and modifications can be made within the range that does not deviate from the technical idea of the present disclosure for a person having an ordinary skill in the art to which the present disclosure pertains, and thus, the above-mentioned present disclosure is not limited to the above-mentioned implementations and accompanying drawings.

What is claimed is:

1. An apparatus for induction heating and wireless power transmission, the apparatus comprising:
    a first group of working coils comprising a first working coil and a second working coil that are electrically connected to each other in parallel;
    a first inverter configured to perform a switching operation to generate a resonance current in at least one of the first working coil or the second working coil;
    a first semiconductor switch electrically connected to the first working coil and configured to turn on and turn off the first working coil;
    a second semiconductor switch electrically connected to the second working coil and configured to turn on and turn off the second working coil;

a first resonance capacitor electrically connected between the first working coil and the first semiconductor switch;

a second resonance capacitor electrically connected between the second working coil and the second semiconductor switch; and a controller configured to:
  turn on the first semiconductor switch at a first time point P1,
  provide the first inverter with N pulses from a starting time point P1' to an end time point P1", wherein a first delay is provided between the first time point P1 and the start time point P1',
  detect an attenuation degree of the resonance current generated in the first working coil,
  detect whether an object is disposed above the first working coil based on the attenuation degree of the resonance current,
  turn off the first semiconductor switch at a second time point P2, wherein a second delay is provided between the end time point P1" and the second time point P2, and
  turn on the second semiconductor switch at the second time point P2 at which the first semiconductor switch is turned off.

2. The apparatus of claim 1, wherein the controller is configured to:
  compare a first attenuation degree of the resonance current generated in the first working coil with a second attenuation degree of the resonance current generated in the second working coil; and
  based on the first attenuation degree being greater than the second attenuation degree, determine that the object is disposed above the first working coil.

3. The apparatus of claim 1, wherein the controller is configured to:
  compare a magnitude of the resonance current generated in the first working coil with a reference magnitude; and
  based on the magnitude of the resonance current generated in the first working coil being less than the reference magnitude, determine that the object is disposed above the first working coil.

4. The apparatus of claim 1, wherein the controller is configured to, based on detecting whether the object is disposed above the at least one of the first working coil or the second working coil, sequentially detect whether the object is disposed above other working coils of the first group of working coils.

5. The apparatus of claim 1, wherein N is any one of 1, 2, or 3.

6. The apparatus of claim 1, wherein N is 1.

7. The apparatus of claim 1, wherein the first delay is a predetermined period of time from the first time point P1 to the start time point P1' at which a first pulse among the N pulses starts to be provided.

8. The apparatus of claim 1, wherein the controller is configured to turn off the second semiconductor switch after turning off the first semiconductor switch at the second time point P2.

* * * * *